(12) United States Patent
Yu et al.

(10) Patent No.: US 8,414,002 B2
(45) Date of Patent: Apr. 9, 2013

(54) VEHICULAR L-TYPE SUSPENSION ARM

(75) Inventors: Xiao Yu, Troy, OH (US); Bing Liu, Troy, OH (US); Hiroyuki Watanabe, Troy, OH (US); Katsumi Nagahori, Tochigi (JP); Mitsuru Inoue, Tochigi (JP)

(73) Assignee: F. Tech Incorporation, Saitama (JP)

( * ) Notice: Subject to any disclaimer, the term of this patent is extended or adjusted under 35 U.S.C. 154(b) by 0 days.

(21) Appl. No.: 13/127,686

(22) PCT Filed: Nov. 4, 2009

(86) PCT No.: PCT/JP2009/068808
§ 371 (c)(1),
(2), (4) Date: Aug. 16, 2011

(87) PCT Pub. No.: WO2010/053082
PCT Pub. Date: May 14, 2010

(65) Prior Publication Data
US 2011/0285102 A1 Nov. 24, 2011

(30) Foreign Application Priority Data
Nov. 5, 2008 (JP) .................................. 2008-284787

(51) Int. Cl.
*B60G 3/04* (2006.01)
*B21D 53/88* (2006.01)

(52) U.S. Cl.
USPC .................................. 280/124.134; 29/897.2

(58) Field of Classification Search ........... 280/124.121, 280/124.125, 124.134, 124.135, 124.138, 280/124.143, 124.15, 124.153; 29/897.2
See application file for complete search history.

(56) References Cited

U.S. PATENT DOCUMENTS

| 5,662,349 A | 9/1997 | Hasshi et al. |
| 5,695,213 A | 12/1997 | Nakamura et al. |

(Continued)

FOREIGN PATENT DOCUMENTS

| CN | 1147459 A | 4/1997 |
| CN | 1697740 A | 11/2005 |
| DE | 198 43 825 A1 | 3/2000 |
| DE | 200 09 695 U1 | 9/2000 |

(Continued)

OTHER PUBLICATIONS

Chinese Office Action issued Jan. 17, 2013, in counterpart Chinese Patent Application No. 200980153445 (5 pages).

*Primary Examiner* — Joseph Rocca
(74) *Attorney, Agent, or Firm* — Arent Fox LLP

(57) ABSTRACT

A vehicular L-type suspension arm is provided in which a wheel support part is provided on one end part of an arm main body, and a first vehicle body side linking portion and a second vehicle body side linking portion are provided in an intermediate part and on the other end part thereof respectively, wherein an arm main body (A) includes an upper half body (AU) having an inverted U-shaped cross-section and a lower half body (AL) that blocks the lower open end of the upper half body (AU), a first vehicle body side linking portion (AF1) is formed from front and rear support plates (SF, SR) each formed by press forming a plate material, these front and rear support plates (SF, SR) have base parts (SFa, Sra) that are integrally joined to each other, the base ends thereof being welded to an outside part of the arm main body (A), extremity parts (SFb, SRb) of the front and rear support plates (SF, SR) are arranged so as to be spaced from each other in the vehicle body fore-and-aft direction, and cylindrical bush support parts (P1) are integrally formed with the extremity parts (SFb, SRb) by burring on the same axis. Thus, the first vehicle body side linking portion can be prepared at light weight and low cost while ensuring a sufficient cross-section with a joined two-piece structure.

5 Claims, 15 Drawing Sheets

| U.S. PATENT DOCUMENTS | | | |
|---|---|---|---|
| 8,100,423 B2 * | 1/2012 | Kruse et al. | 280/124.134 |
| 2002/0005621 A1 | 1/2002 | Christophliemke et al. | |
| 2004/0135337 A1 * | 7/2004 | Alesso et al. | 280/124.134 |
| 2005/0104315 A1 | 5/2005 | Howell et al. | |
| 2006/0151970 A1 | 7/2006 | Kaminski et al. | |
| 2011/0198821 A1 * | 8/2011 | Hessing et al. | 280/124.134 |
| 2012/0217717 A1 * | 8/2012 | Lindtner et al. | 280/124.134 |

| FOREIGN PATENT DOCUMENTS | | |
|---|---|---|
| JP | 3159288 B2 | 4/2001 |
| JP | 2002-98132 A | 4/2002 |
| JP | 2002-219918 A | 8/2002 |
| JP | 2004-533952 A | 11/2004 |
| JP | 4038890 B2 | 1/2008 |

* cited by examiner

FIG.14
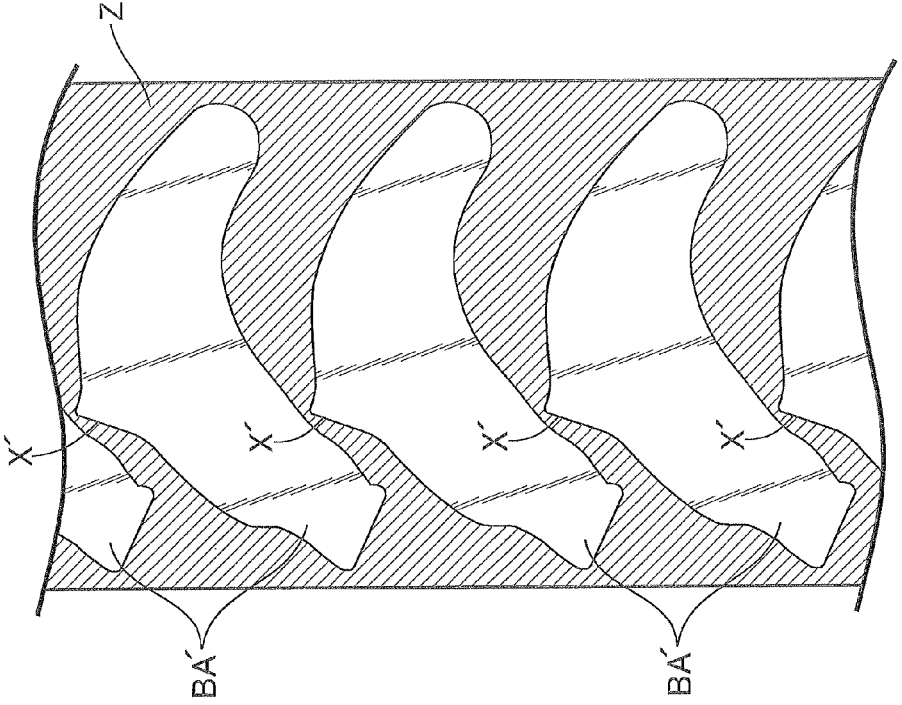
(CONVENTIONAL EXAMPLE)
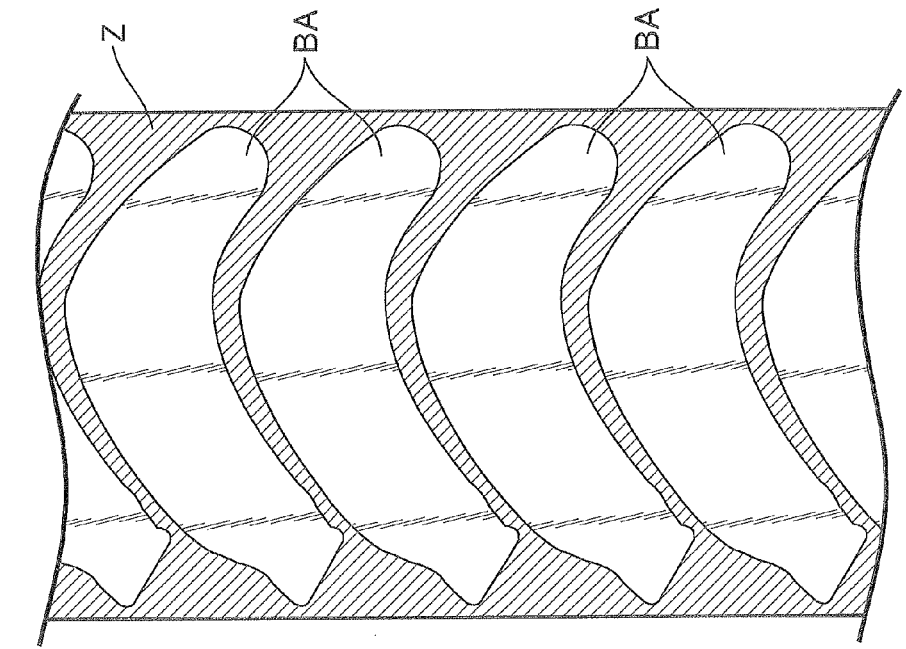
(PRESENT INVENTION)

FIG.16
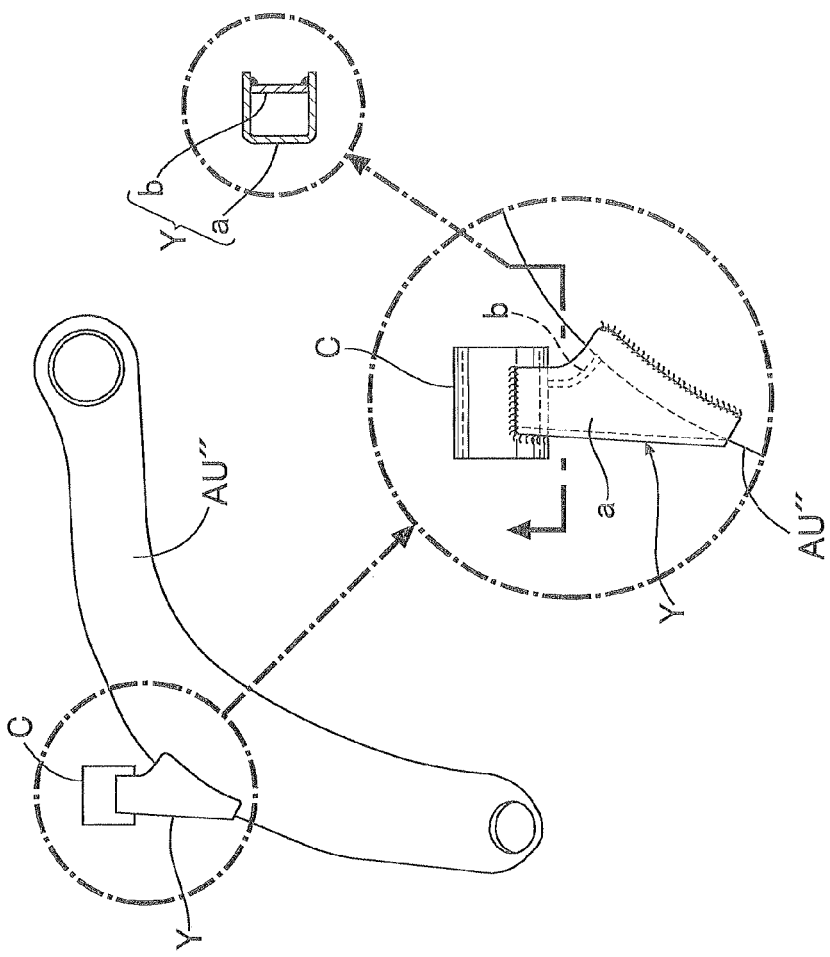
(CONVENTIONAL EXAMPLE 2)
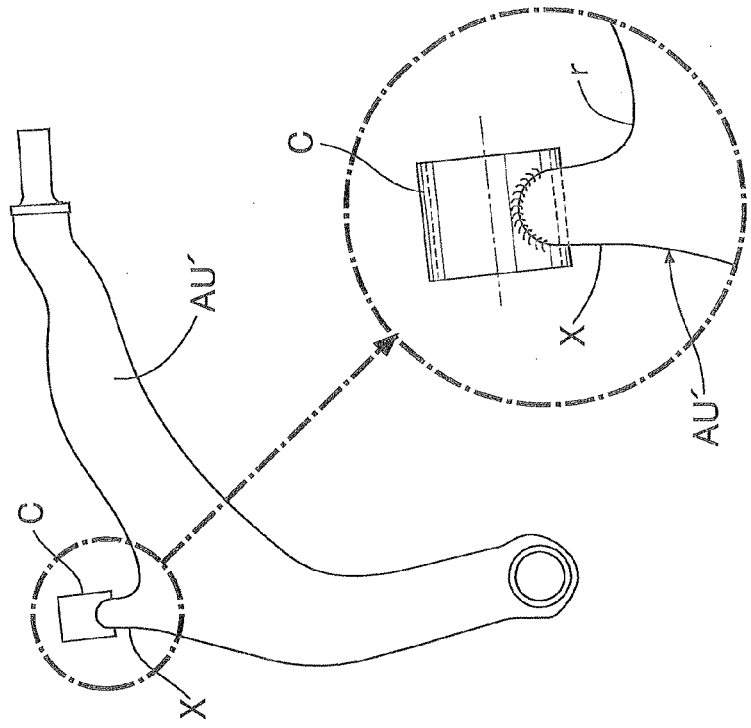
(CONVENTIONAL EXAMPLE 1)

VEHICULAR L-TYPE SUSPENSION ARM

CROSS-REFERENCE TO RELATED APPLICATION

This application is a National Stage entry of International Application No. PCT/JP2009/068808, filed Nov. 4, 2009, which claims priority to Japanese Patent Application No. 2008-284787, filed Nov. 5, 2008 the entire specification claims and drawings of which are incorporated herewith by reference.

TECHNICAL FIELD

The present invention relates to a vehicular suspension arm and, in particular, to an L-type suspension arm in which a wheel support part that is capable of supporting a wheel is provided on one end part of an arm main body that is L-shaped in plan view, a first vehicle body side linking portion that is capable of being swingably linked to a vehicle body via a first bush arranged with an axis thereof lying in a fore-and-aft direction of the vehicle body is provided in an intermediate part of the arm main body, a second vehicle body side linking portion that is capable of being swingably linked to the vehicle body via a second bush arranged with an axis thereof lying in an up-and-down direction is provided on the other end part of the arm main body, and the first vehicle body side linking portion and the second vehicle body side linking portion are disposed on the front side and the rear side respectively in the vehicle body fore-and-aft direction.

BACKGROUND ART

The above-mentioned L-type suspension arm is widely used as a lower arm, etc. of an automobile, and a conventional structure is known in which, in order to reduce the weight of the suspension arm, the arm main body is formed from an upper half body and a lower half body, the upper half body being formed by press forming of a plate material so as to have an inverted U-shaped cross-section, and the lower half body being fixed so as to block the lower open end of the upper half body (ref. Patent Documents 1 and 2 below).

Patent Document 1: Japanese Patent Application Laid-open No. 2002-219918
Patent Document 2: Japanese Patent No. 4038890

DISCLOSURE OF INVENTION

Problems to be Solved by the Invention

In the arrangement of Patent Document 1, as shown in Conventional Example 1 of FIG. 16, when press forming an upper half body AU' of an arm main body, a horn-shaped support part X for supporting a collar C, which is the first vehicle body side linking portion, is simultaneously and integrally formed in a longitudinally intermediate part of the upper half body AU'. It is therefore necessary to form a horn-shaped projecting portion X' (see FIG. 14), which protrudes considerably from the main line, in a blank material BA' before press forming so as to correspond to the horn-shaped support part X, and this projecting portion X' is the main cause of degradation in the efficiency with which blank materials BA' can be arranged in a starting plate material Z (and, consequently, in the material yield) and of an increase in materials cost. Furthermore, since it is necessary to form a curved face r having a large curvature between the horn-shaped support part X and an outside face of the upper half body AU', there are the problems that the ease of press forming is poor and the forming step becomes complicated. Moreover, it is necessary to form with high precision a concave arc-shaped collar mating surface on an extremity part of the horn-shaped support part X, the mating surface conforming to an outer peripheral face of the collar, which is welded thereto, and since the forming direction (left-and-right direction in FIG. 16) for the mating surface is perpendicular to the press direction (direction perpendicular to the plane of the paper in FIG. 16) of the upper half body AU', it is necessary to additionally prepare a special die employing a side cam used exclusively therefor, and this introduces problems for the die such as increased production cost, increased management cost, and degradation of durability.

In order to solve these problems with Conventional Example 1, a technique in which an auxiliary bracket corresponding to the horn-shaped support part is formed separately from the upper half body of the arm main body and subsequently added is already known from Patent Document 2. However, in this arrangement of Patent Document 2, as shown in Conventional Example 2 of FIG. 16, since an auxiliary bracket Y having a joined structure in which a pair of bracket halves a and b are welded is welded to an upper half body AU'', and an outer peripheral face of a collar C, which is the first vehicle body side linking portion, is further welded to an extremity part of the auxiliary bracket Y, there are the problems that the overall number of components (three components in total) increases and the management thereof becomes complicated; furthermore, since it is necessary to join the pair of bracket halves a and b strongly to the collar C, the weld length is long, and from the viewpoint of ensuring the thermal strength and the inner diameter precision of the collar C, it is necessary for the collar C itself to have a sufficient thickness, thereby introducing the problems of weight increase and cost increase. Moreover, since it is necessary to ensure sufficient welding allowance in order to enhance the strength of the weld between the auxiliary bracket Y and the collar C, the auxiliary bracket Y is inevitably formed so as to have a smaller width than the total length of the collar C and, therefore, in order to increase the weld strength it is necessary to ensure a required cross-section by increasing the sheet thickness of the two bracket halves a and b, thereby introducing the problem of further increases in weight and cost.

The present invention has been accomplished in light of such circumstances, and it is an object thereof to provide a light-weight and low-cost vehicular L-type suspension arm that can solve the above-mentioned problems with the conventional structure by means of a simple structure.

Means for Solving the Problems

In order to attain the above object, according to a first aspect of the present invention, there is provided a vehicular L-type suspension arm in which a wheel support part that is capable of supporting a wheel is provided on one end part of an arm main body that is L-shaped in plan view, a first vehicle body side linking portion that is capable of being swingably linked to a vehicle body via a first bush arranged with an axis thereof lying in a fore-and-aft direction of the vehicle body is provided in an intermediate part of the arm main body, and a second vehicle body side linking portion that is capable of being swingably linked to the vehicle body via a second bush arranged with an axis thereof lying in an up-and-down direction is provided on the other end part of the arm main body, the first vehicle body side linking portion and the second vehicle body side linking portion being disposed on the front side and the rear side respectively in the vehicle body fore-and-aft direction, characterized in that the arm main body comprises an upper half body formed with an inverted U-shaped cross-section by press forming a plate material while having an upper wall part and a pair of side wall parts extending downward from opposite sides of the upper wall part, and a lower half body secured to the upper half body so as to block a lower open end thereof, the first vehicle body side linking portion comprises front and rear support plates that are each formed by press forming a plate material and are arranged in the vehicle body fore-and-aft direction, the front and rear support plates have base parts thereof integrally joined to each other, base ends thereof are each welded to an outside part of the arm main body, extremity parts of the front and rear support plates are arranged so as to be spaced from each other in the vehicle body fore-and-aft direction, and the extremity parts each have a cylindrical bush support part formed integrally therewith on the same axis by burring, the bush support part being capable of fitting onto and supporting an outer tubular part of the first bush.

According to a second aspect of the present invention, in addition to the arrangement of the first aspect, with regard to the base parts of the front and rear support plates, at least one portion thereof has a closed cross-sectional structure due to the base parts being joined to each other.

According to a third aspect of the present invention, in addition to the arrangement of the first or second aspect, the front and rear support plates are each formed by press forming with a direction in which the support plates move closer to each other along the vehicle body fore-and-aft direction as the press direction, a linking arm part is formed integrally with an edge part on at least one side of the base part of at least one support plate by the above press forming, the linking arm part extending toward the other support plate, and the front and rear support plates are joined by welding between the linking arms or between the linking arm part and the other support plate.

According to a fourth aspect of the present invention, in addition to the arrangement of any one of the first to third aspects, each of the base parts of the front and rear support plates is welded, among the upper and lower half bodies of the arm main body, to the upper half body.

According to a fifth aspect of the present invention, in addition to the arrangement of any one of the first to fourth aspects, at least one part of the base end of each of the front and rear support plates is integrally provided with a joining flange part that is in surface contact with and welded to an outer face of the arm main body.

Effects of the Invention

In accordance with the first aspect of the present invention, since, in the L-type suspension arm, the first vehicle body side linking portion, on which a large fore-and-aft load from a wheel acts, can be simply formed while ensuring a sufficient cross-section by means of the joined two-piece structure that is formed from the front and rear support plates that are each press formed and welded to the outside part of the arm main body, not only is it possible to simplify the management of components, but it is also possible to make a large contribution to reducing weight and cutting cost. Furthermore, the outline of the blank material before press forming the arm main body can be formed as smoothly as possible, the material yield is improved, and the cost can be cut further. Moreover, since the cylindrical bush support parts are formed integrally with the extremity parts of the front and rear support plates by burring on the same axis, the bush support parts can be integrated with the front and rear support plates without specially welding a collar; consequently, not only is it possible to solve the conventional problems with welding of a collar, but it is also possible to ensure a sufficient support span for the first bush, which is supported by fitting into the bush support part, and the support can thereby be stabilized by a simple structure.

Furthermore, in accordance with the second aspect of the present invention in particular, since at least one part of the base parts of the front and rear support plates has a closed cross-sectional structure due to the base parts being joined to each other, at least one part of the base parts of the front and rear support plates has a tubular cross-section, thus enhancing the rigidity and strength of the base part of each support plate formed from a plate material and accordingly increasing the rigidity with which the first bush is supported (rigidity of linking to vehicle body).

Moreover, in accordance with the third aspect of the present invention in particular, it is possible to sufficiently enhance the strength of the weld between the front and rear support plates while simplifying the pressing step therefor as much as possible.

Furthermore, in accordance with the fourth aspect of the present invention in particular, since the base part of each of the front and rear support plates is welded, among the upper and lower half bodies of the arm main body, to the upper half body, the face on which there is a welded joint to the support plates of the arm main body is the upper half body, that is, one large face, and it is therefore possible to carry out continuous strong welding, thus contributing to stabilization of the weld quality. Moreover, this effect is particularly outstanding when there is little or zero downward protrusion of the lower half body from the lower end of the side wall part of the upper half body, that is, when the effective height of the side wall part of the upper half body is high.

Moreover, in accordance with the fifth aspect of the present invention in particular, since the joining flange part is integrally provided so as to be connected to at least one part of the base end of each of the front and rear support plates, the joining flange part being welded to an outer face of the arm main body so as to be in surface contact therewith, it is possible by means of the joining flange part to stabilize the precision of the gap with the outer face of the upper half body, thus improving the ease of welding and further stabilizing the weld quality. Furthermore, due to the joining flange part being specially provided, the front and rear support plates can be welded to the outer face of the upper half body in a stable attitude, and it is therefore easy to ensure the weld strength. Moreover, even when the lower half body protrudes further downward than the lower end of the side wall part of the upper half body and there is a step on the outer face of the part where the upper and lower half bodies meet, by pressing the front and rear support plates with a direction along the vehicle body fore-and-aft direction as the press direction, it becomes possible to easily and reliably form a step in the joining flange corresponding to the above step, and it is possible to stably ensure the join quality of the weld between the upper and lower half bodies and the joining flange.

BRIEF DESCRIPTION OF DRAWINGS

FIG. 14 is an explanatory diagram for schematically showing a mode in which scrap is generated when a blank material before press forming an arm main body is stamped from a plate material by comparing a case in accordance with the present invention and a case in accordance with a Conventional Example.

FIG. 16 is an explanatory schematic diagram of a suspension arm of a Conventional Example.

EXPLANATION OF REFERENCE NUMERALS AND SYMBOLS

A Arm main body
AF1 First vehicle body side linking portion
AF2 Second vehicle body side linking portion
AL Lower half body
AU Upper half body
AW Wheel support part
B1 First bush
B2 Second bush
F Vehicle body
LA Lower arm (L-type suspension arm)
P1 First bush support part (bush support part)
SF Front support plate
SR Rear support plate
SFa Base part of front support plate
SRa Base part of rear support plate
SFb Extremity part of front support plate
SRb Extremity part of rear support plate
w1 to w9 welds
1 Upper wall part
2 Side wall part
3f1, 3f2 Joining flange part of front support plate
3u, 3l Linking arm part of front support plate
4f1, 4f2 Joining flange part of rear support plate
4u Linking arm part of rear support plate

BEST MODE FOR CARRYING OUT THE INVENTION

Modes for carrying out the present invention are specifically explained below by reference to embodiments of the present invention illustrated in the attached drawings.

In the attached drawings, FIG. 1 to FIG. 14 show one embodiment of the present invention.

Figure 1:
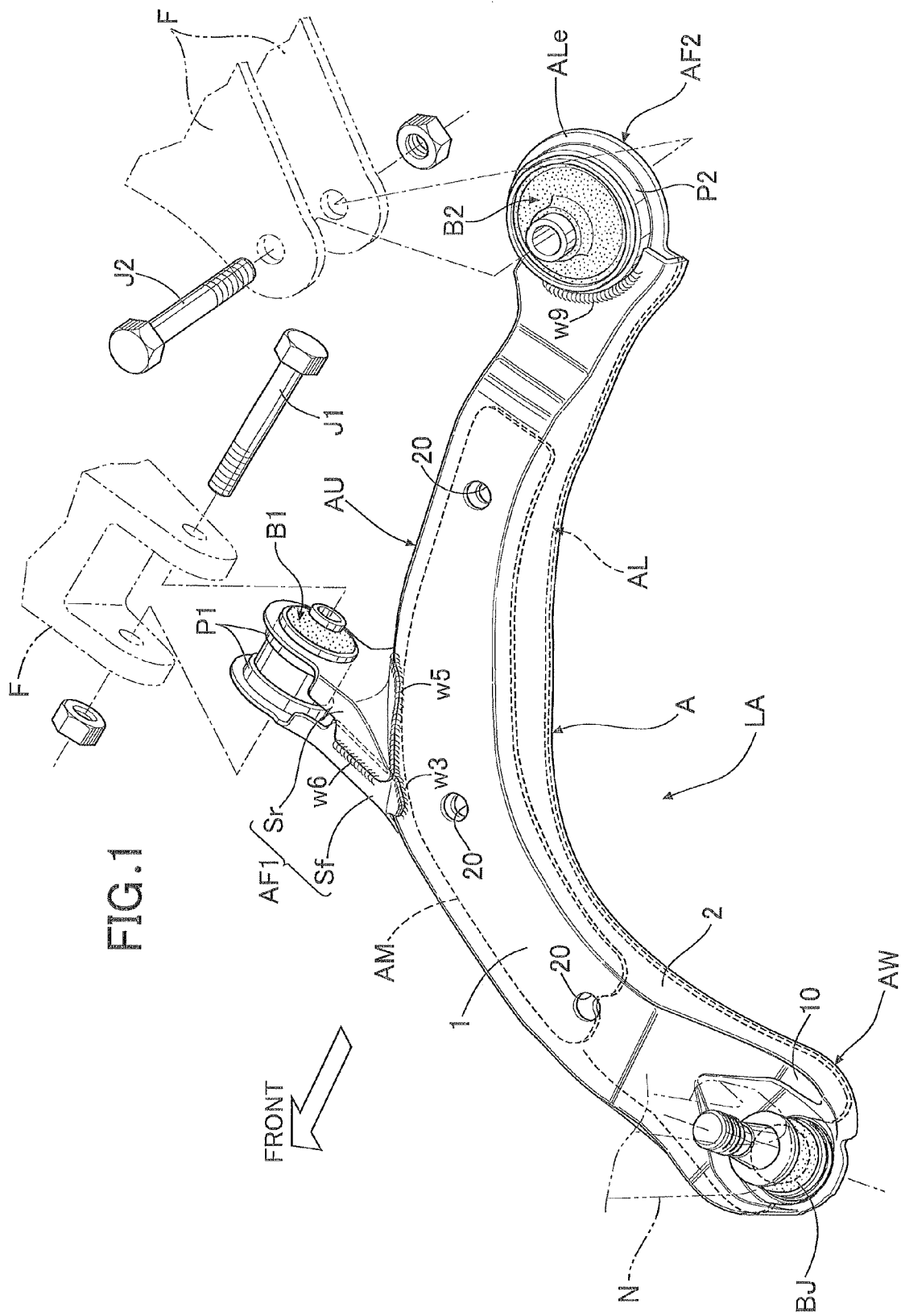
FIG. 1 is a simplified perspective view showing a mode of mounting an automobile suspension arm (L-type lower arm) related to one embodiment of the present invention on a vehicle.
Figure 2:
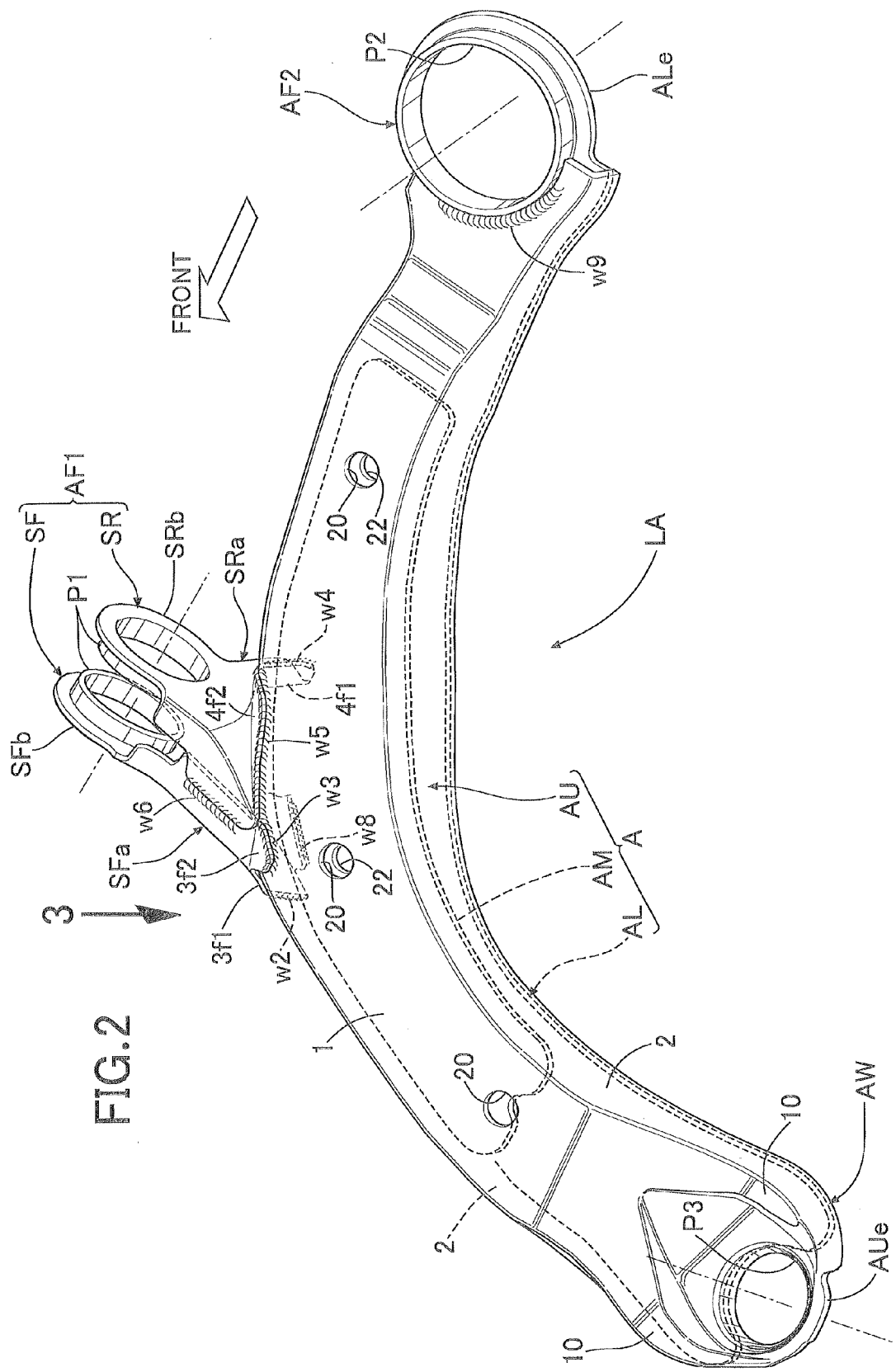
FIG. 2 is a perspective view of the suspension arm on its own.
Figure 3:
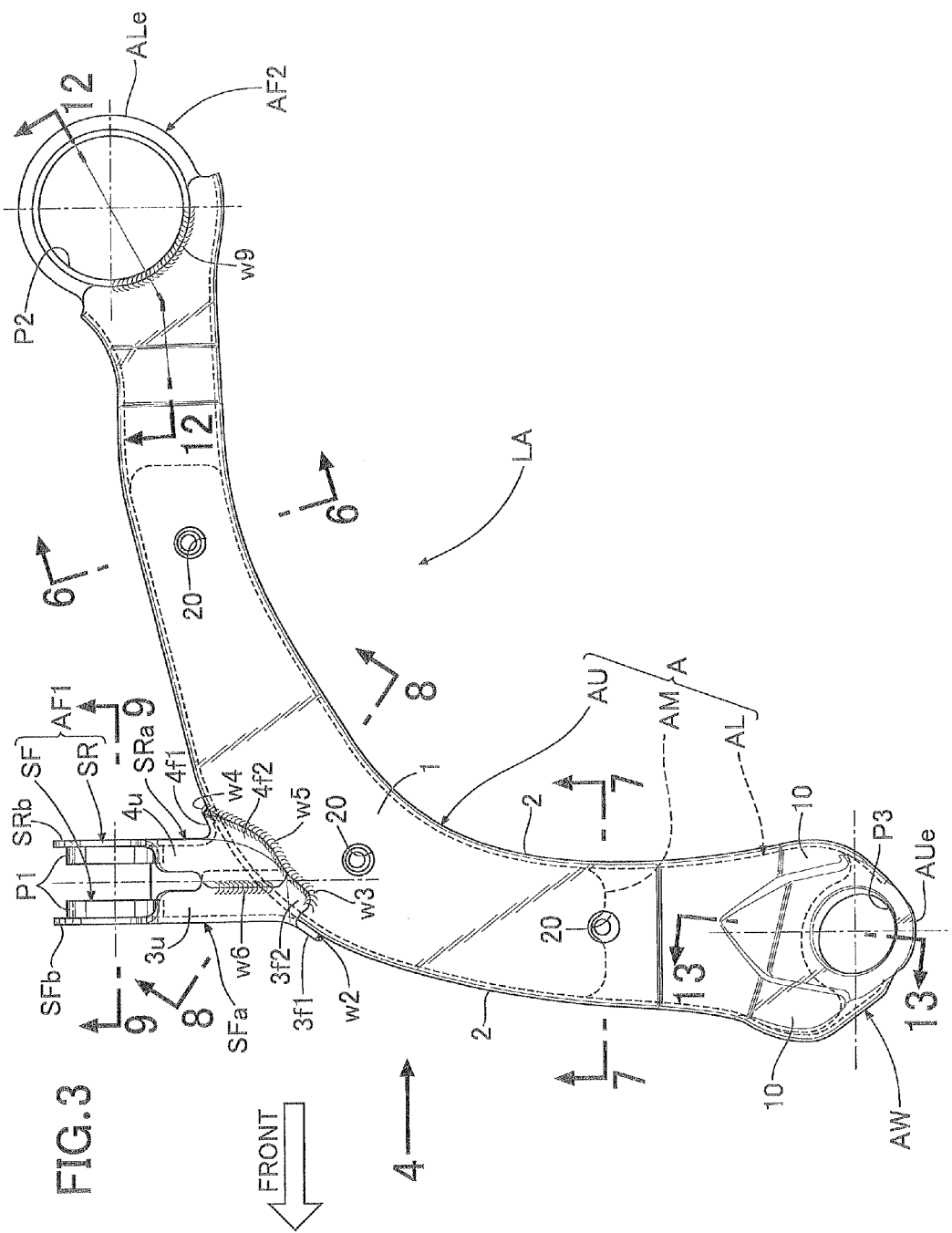
FIG. 3 is a plan view of the suspension arm on its own (view from arrow 3 in FIG. 2).
Figure 4:
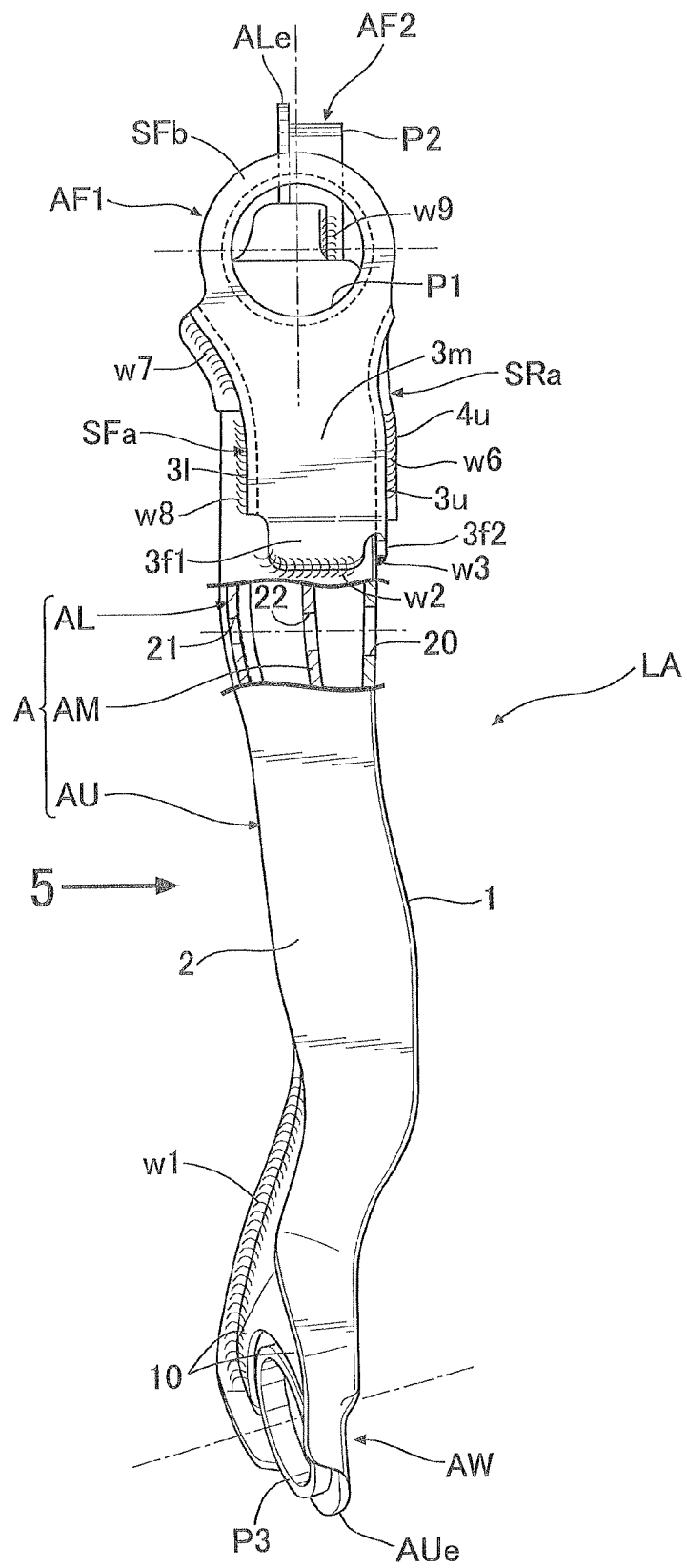
FIG. 4 is a side view of the suspension arm on its own (view from arrow 4 in FIG. 3).
Figure 5:
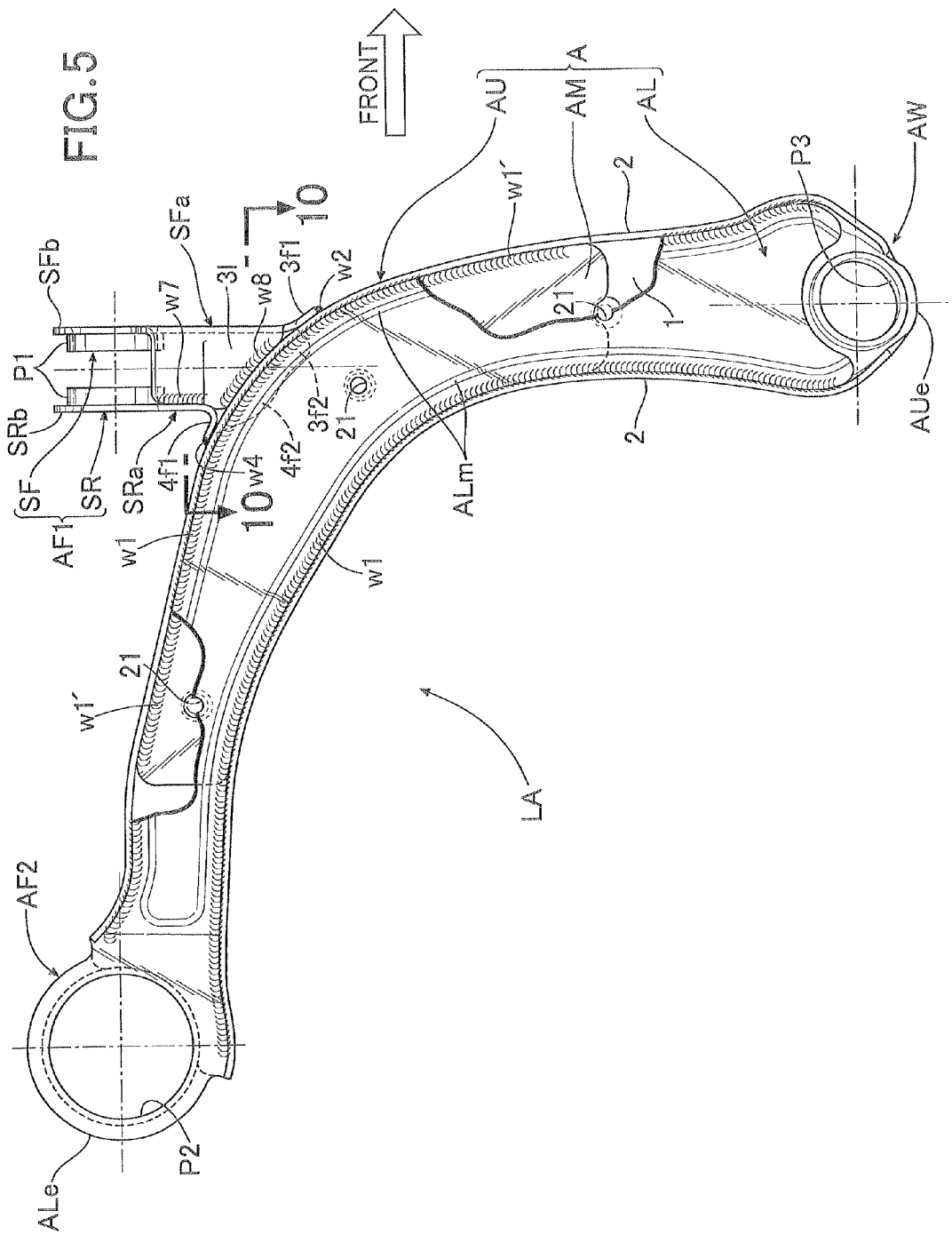
FIG. 5 is a bottom view of the suspension arm on its own (view from arrow 5 in FIG. 4).
Figure 6:
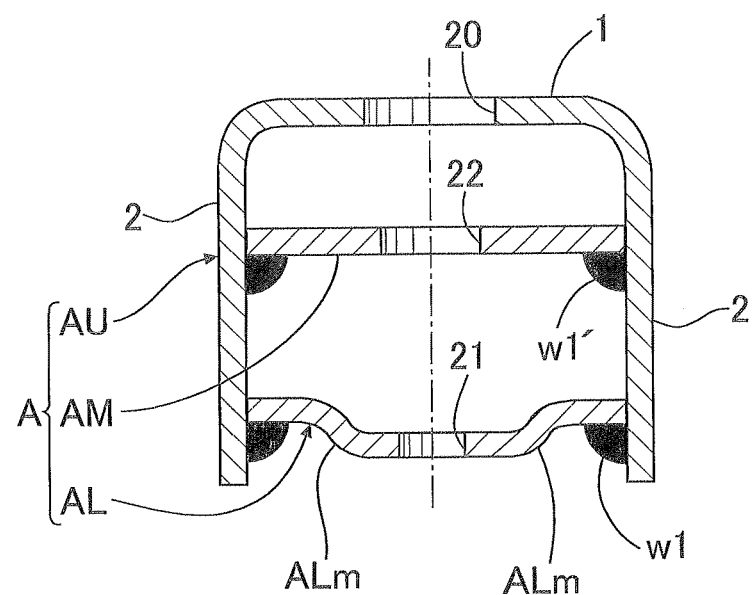
FIG. 6 is an enlarged sectional view along line 6-6 in FIG. 3.
Figure 7:
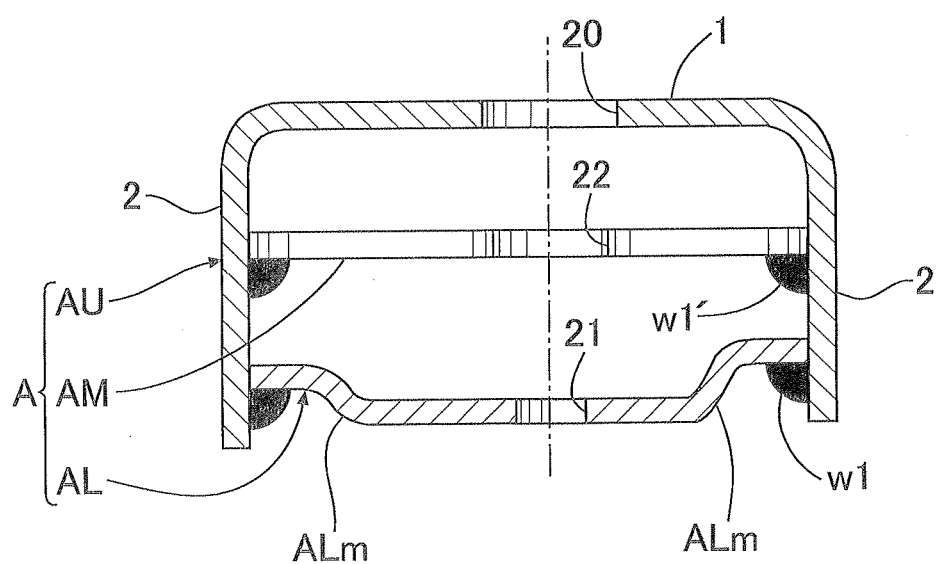
FIG. 7 is an enlarged sectional view along line 7-7 in FIG. 3.
Figure 8:
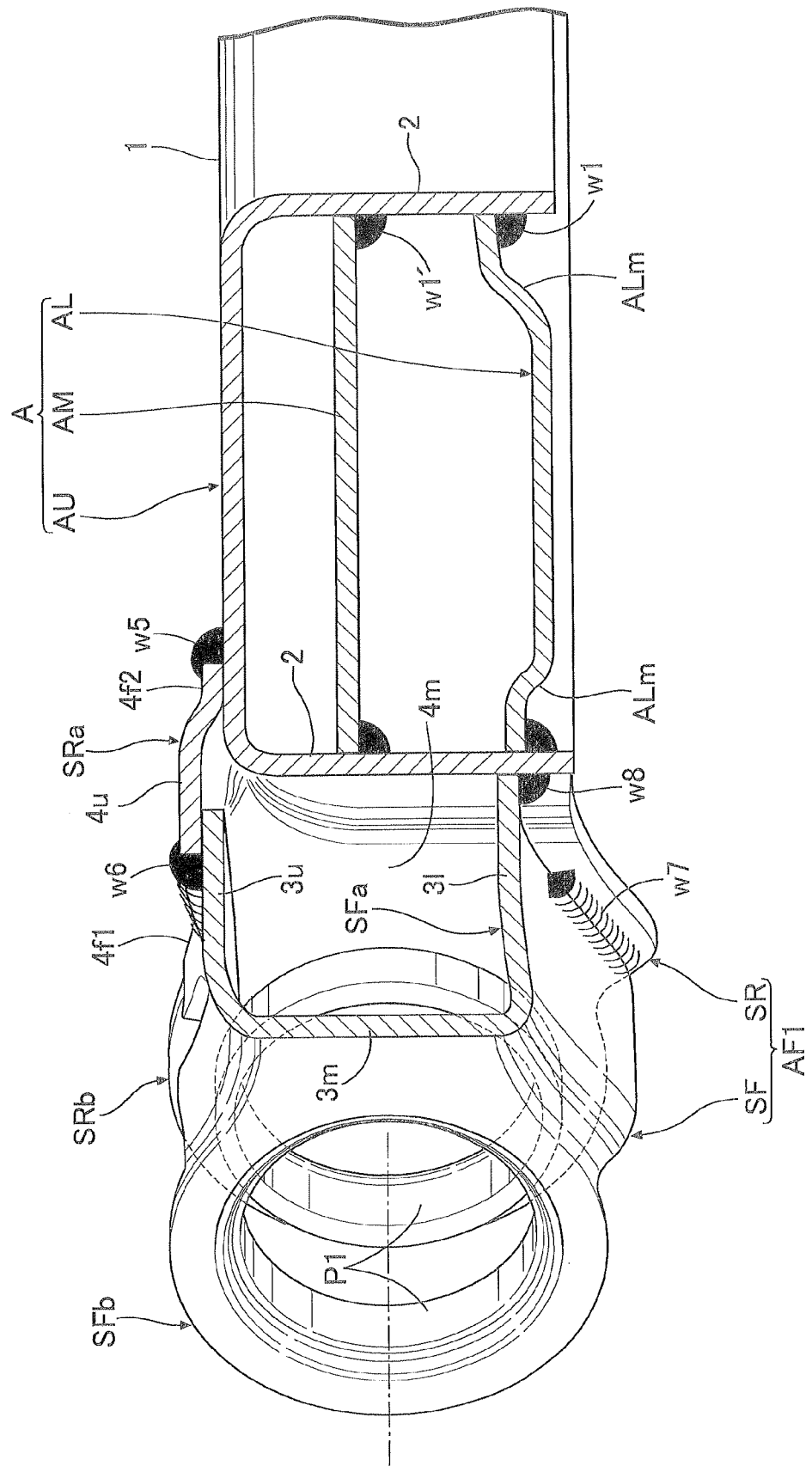
FIG. 8 is an enlarged sectional view along line 8-8 in FIG. 3.
Figure 9:
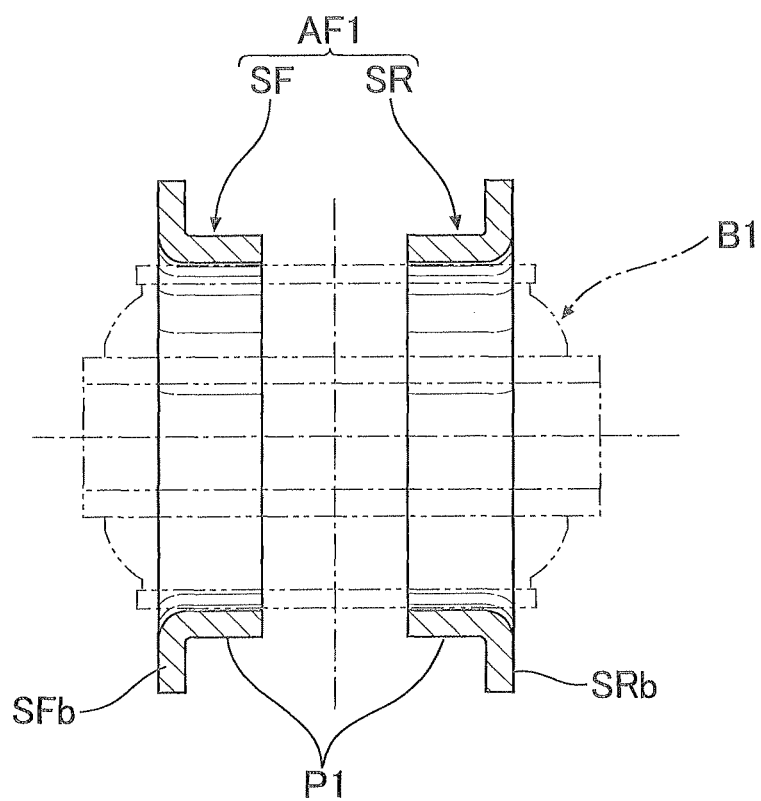
FIG. 9 is a transverse sectional view of an essential part of a first bush support part (enlarged sectional view along line 9-9 in FIG. 3).

First, in FIG. 1, a lower part of a wheel support member N such as a knuckle that rotatably supports a wheel and an upper part of the wheel support member N are vertically movably supported on the vehicle body or a sub-frame linked thereto (hereinafter, simply called a vehicle body F) by a lower arm LA and an upper arm (not illustrated) respectively. The lower arm LA is a so-called L-type arm and forms an arm member of the present invention.

An arm main body A of the lower arm LA has a substantially 'dogleg'-shaped or 'L'-shaped form in plan view, and a wheel support part AW is provided on one end part thereof, the wheel support part AW being swivelably linked to the wheel support member N via a ball joint BJ. Furthermore, a first vehicle body side linking portion AF1 is provided in a bent intermediate part of the arm main body A, the first vehicle body side linking portion AF1 being able to be swingably linked to the vehicle body F via a first linking pin J1 and a first bush B1 disposed with their axes in the vehicle body fore-and-aft direction and, furthermore, a second vehicle body side linking portion AF2 is provided on the other end part, that is, a rear end part in the vehicle body fore-and-aft direction, of the arm main body A, the second vehicle body side linking portion AF2 being able to be swingably linked to the vehicle body F via a second linking pin J2 and a second bush B2 disposed with their axes lying in the up-and-down direction.

One example of the structure of the lower arm LA is now specifically explained by reference in addition to FIG. 2 to FIG. 13. First, in FIG. 2 to FIG. 7, the arm main body A has a closed cross-sectional hollow structure in which an upper half body AU and a lower half body AL are integrally joined to each other, the upper half body AU and the lower half body AL each being formed by press forming a steel sheet, and the upper half body AU is formed with an inverted U-shaped cross-section while having an upper wall part 1 and a pair of side wall parts 2 extending downward from opposite sides in the width direction of the upper wall part 1.

Furthermore, the lower half body AL is basically formed in a flat plate shape and has a substantially 'dogleg'-shaped or 'L'-shaped form in plan view so as to block the lower open end of the upper half body AU. End faces on opposite sides in the width direction of the lower half body AL are butt-welded by welds w1 to inner faces of the pair of side wall parts 2 of the upper half body AU. Curved parts ALm are formed on the lower half body AL along the longitudinal direction of the lower half body AL when press forming the lower half body AL, the curved parts ALm providing a smooth connection between an intermediate part in the width direction of the lower half body AL and end parts on opposite sides in the width direction that are at a higher position than the intermediate part (that is, the inner side of the upper half body AU).

As described above, by making the lower half body AL have a basically flat plate shape, since the step of press processing a main body portion of the lower half body AL can be simplified as much as possible, processing can be done using a progressive die, thus saving processing cost and improving the work efficiency. Moreover, due to the curved part ALm being specially provided, the end faces on opposite sides of the lower half body AL can be spaced upward considerably from the lower open end of the upper half body AU while ensuring a sufficient cross-sectional height for the arm main body A, and it is therefore possible to ensure a sufficient welding allowance between the end faces on opposite sides of the lower half body AL and the inner faces of the side wall parts 2 of the upper half body AU, thus enhancing the weld strength.

Furthermore, a reinforcing plate AM is housed within the upper half body AU, the reinforcing plate AM dividing the inner space thereof into upper and lower parts, and the end faces on opposite sides of the reinforcing plate AM are each butt-welded by welds w1' to the opposing inner faces of the opposite side wall parts 2 of the upper half body AU. This reinforcing plate AM is added as desired, and the number thereof installed may be increased or it may be dispensed with as appropriate according to the strength required for the arm main body A.

In addition, each of the upper half body AU, the lower half body AL, and the reinforcing plate AM has at least one small hole 20, 21, 22 formed so as to extend therethrough with the small holes 20, 21, and 22 at positions corresponding to each other, the small holes 20, 21, and 22 allowing paint to flow through in a step of painting the arm main body A.

The structure of the first vehicle body side linking portion AF1 is now explained by referring in addition to FIG. 8 to FIG. 11. This first vehicle body side linking portion AF1 is formed from a double support plate assembly having a joined two-piece structure in which front and rear support plates SF and SR are each formed by press forming a steel plate and are arranged in the vehicle body fore-and-aft direction. With regard to the front and rear support plates SF and SR, base parts SFa and SRa thereof are welded to each other, and base ends thereof are welded to an outer face of an intermediate part of the arm main body A (only the upper half body AU in the illustrated example).

Extremity parts SFb and SRb of the front and rear support plates SF and SR are arranged in the vehicle body fore-and-aft direction with a space interposed therebetween, and cylindrical first bush support parts P1 and P1 are formed on the same axis integrally with the extremity parts SFb and SRb by burring, an outer tubular part of the first bush B1 being press-fitted into the first bush support parts P1 and P1.

Joining flange parts 3f1, 3f2, 4f1, and 4f2 are integrally provided with at least one part of the base end of each of the front and rear support plates SF and SR at the same time as press processing the front and rear support plates SF and SR, the joining flange parts 3f1, 3f2, 4f1, and 4f2 being in surface contact with and welded by welds w2, w3, w4, and w5 to the outside face (that is, the outer face of the side wall part 2) and the upper face (that is, the outer face of the upper wall part 1) of the upper half body AU.

The front and rear support plates SF and SR are each formed by press forming with a direction in which they move closer to each other along the vehicle body fore-and-aft direction as the press direction; by this press forming a linking arm part is formed integrally with at least one side edge part of the base part SFa, SRa of at least one of the support plates SF and SR, the linking arm extending toward the other support plate SR, SF, and by welding between the linking arms or between the linking arm part and the other support plate the front and rear support plates SF and SR are joined. That is, in the illustrated example, a pair of upper and lower linking arm parts 3u and 3l extending toward the rear support plate SR are formed integrally with upper and lower opposite edge parts of a main body part 3m of the base part SFa of the front support plate SF, whereas an upper linking arm 4u extending toward the front support plate SF is formed integrally with an upper edge part of a main body part 4m of the base part SRa of the rear support plate SR. Extremity parts of the front and rear upper linking arms 3u and 4u are superimposed on one another, brought into surface contact, and welded by a weld w6, an extremity face of the front lower linking arm part 3l is butt-welded by a weld w7 to an inner face of the main body part 4m of the base part SRa of the rear support plate SR, and a side end face of the front lower linking arm part 3l is butt-welded by a weld w8 to the outside face of the upper half body AU.

In accordance with such a mode of pressing the front and rear support plates SF and SR and mode of butt-welding after pressing, it is possible to sufficiently enhance the weld strength of the support plates SF and SR while simplifying as much as possible the step in which they are pressed.

Figure 10:
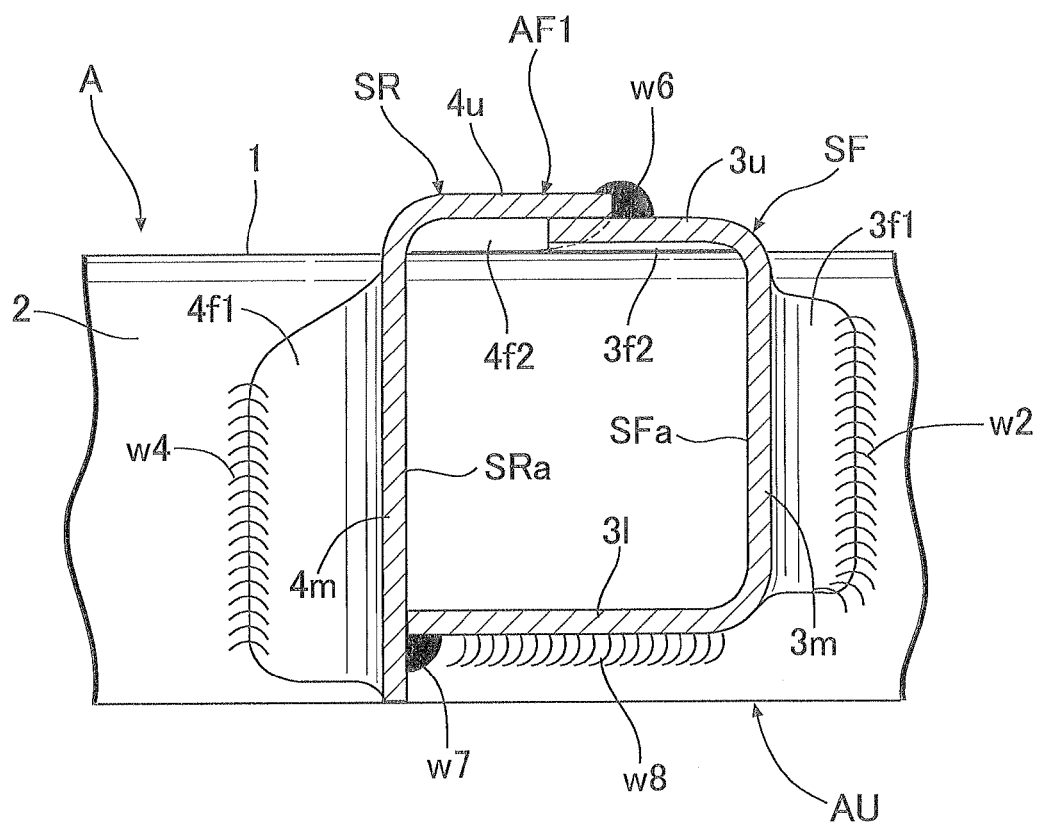
FIG. 10 is a vertical sectional view of an essential part of the first bush support part (enlarged sectional view along line 10-10 in FIG. 5).
Figure 11:
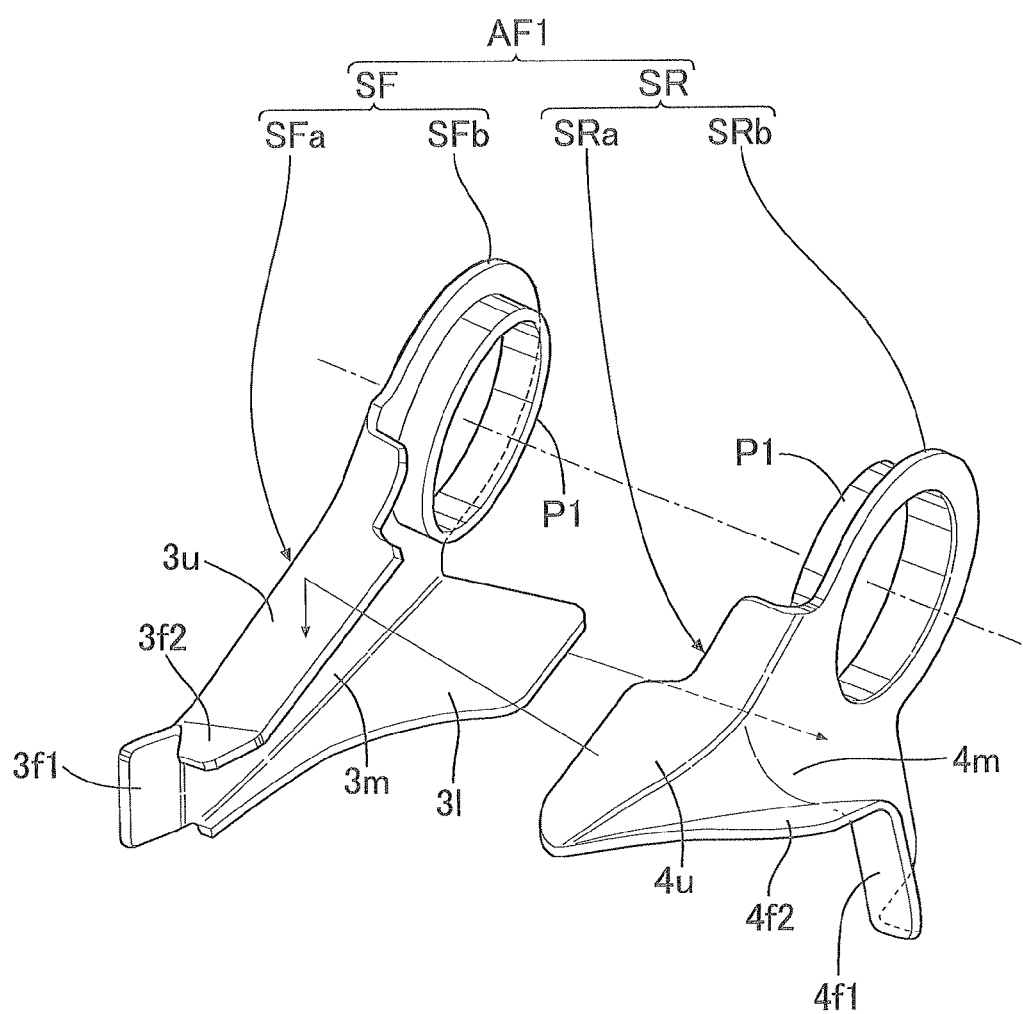
FIG. 11 is an exploded perspective view of a first vehicle body side linking portion.

With regard to the base parts SFa and SRa of the front and rear support plates SF and SR, at least one part thereof is formed in a closed cross-sectional structure as shown in FIG. 10 due to the base parts being joined (welded) to each other.

Figure 12:
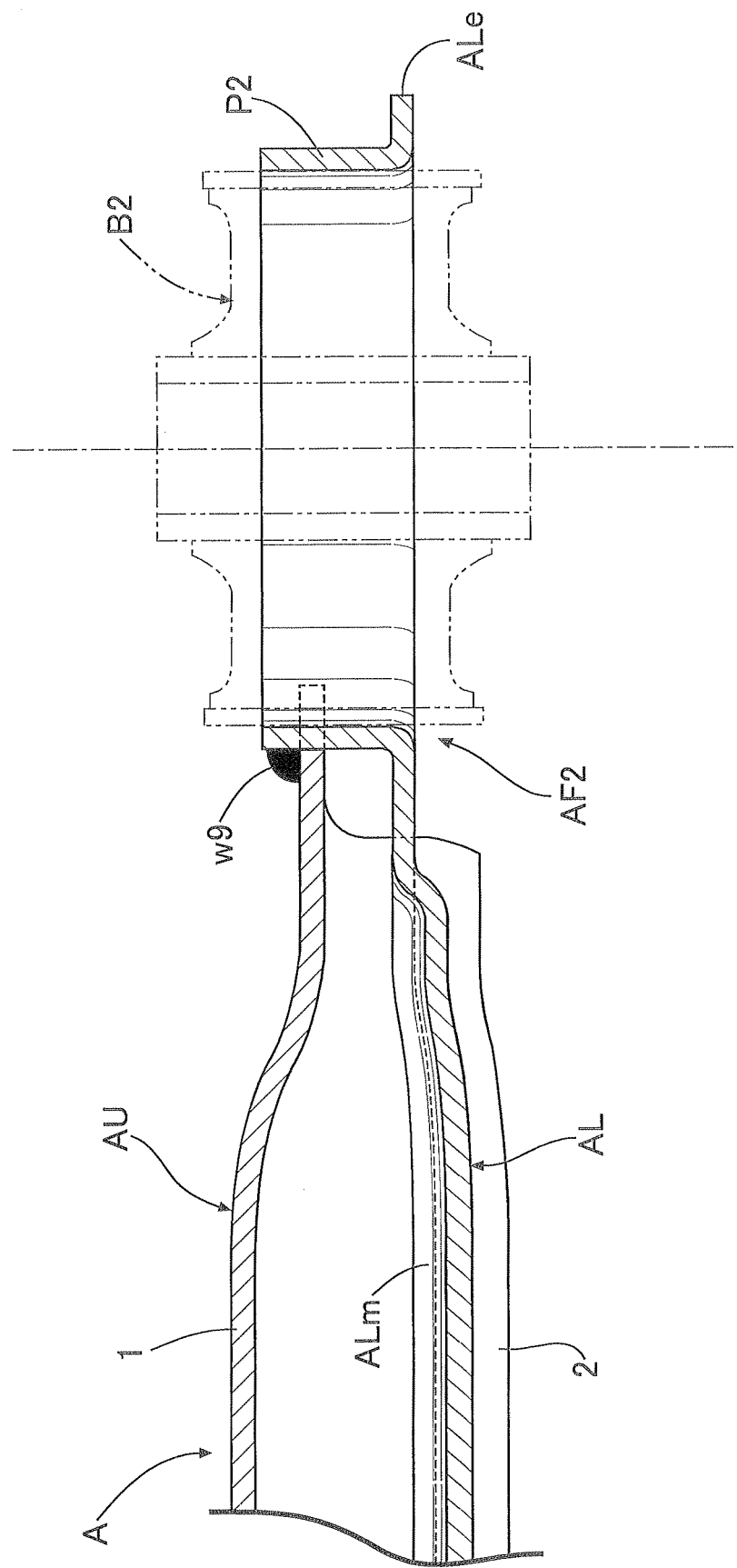
FIG. 12 is a sectional view of an essential part of a second bush support part (enlarged sectional view along line 12-12 in FIG. 3).

The structure of the second vehicle body side linking portion AF2 is now explained by referring in addition to FIG. 12. At the inner end part of the arm main body A, the lower half body AL extends a long way further outward (to the rear of the vehicle body) than the upper half body AU, and an upwardly facing cylindrical second bush support part P2 is formed integrally with the extended part ALe by burring so that the extended part is the second vehicle body side linking portion AF2, the outer tubular part of the second bush B2 being able to be press-fitted into the second bush support part P2. Since the processing height of this burring, that is, the axial dimension of the second bush support part P2, is set to be relatively small (that is, shorter than the overall axial length of the outside part of the second bush B2), forming can be carried out without undue stress, and it is therefore possible to carry out processing simultaneously with or subsequent to processing of the lower half body AL using a progressive die, thus saving cost and improving the work efficiency.

Furthermore, an outer peripheral face, close to the intermediate part of the arm main body A, of the second bush support part P2 thus burred is butt-welded by a weld w9 to the outer end face of the upper half body AU, which is formed in a corresponding arc shape in plan view. In this case, in the illustrated example, the outer peripheral face of the second bush support part P2 projects above the outer end face of the upper half body AU by a predetermined amount, and the outer peripheral face of the projecting part and the upper face of the outer end part of the upper half body AU are welded by the weld w9.

Figure 13:
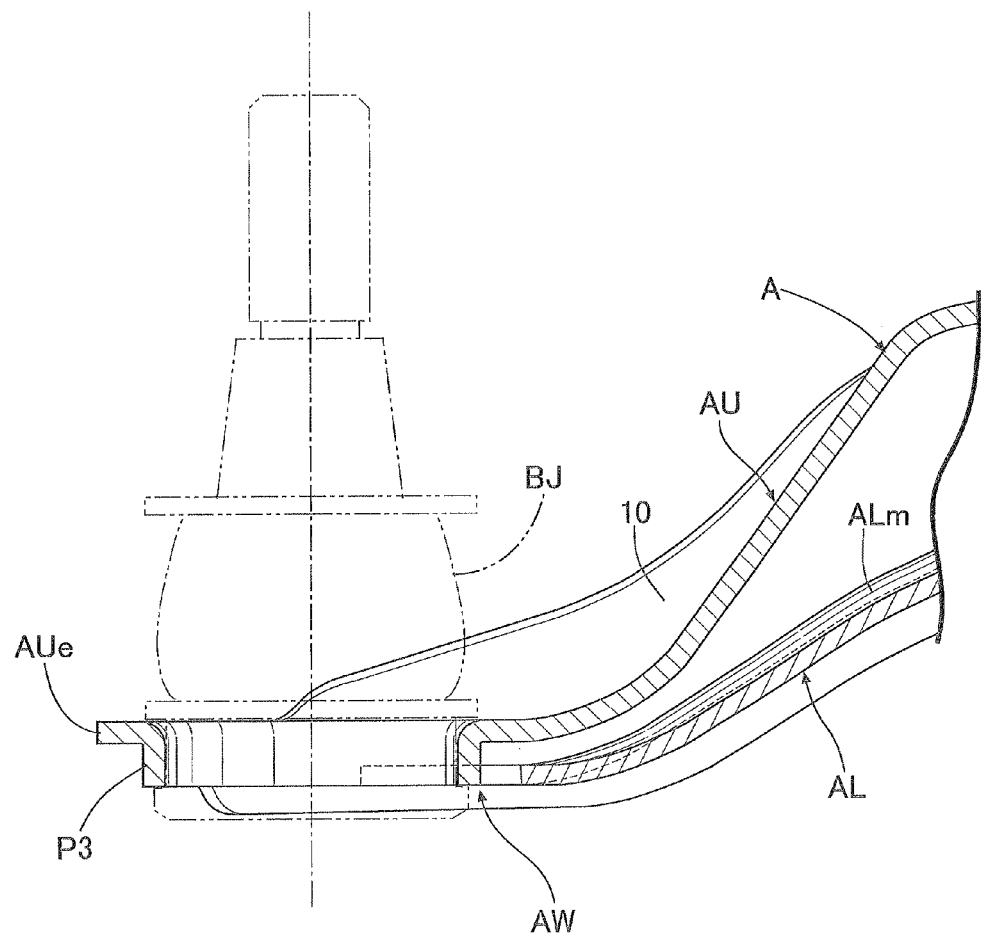
FIG. 13 is a sectional view of an essential part of a wheel support part (enlarged sectional view along line 13-13 in FIG. 3).

The structure of the wheel support part AW is now explained by referring in addition to FIG. 13. At the outer end part of the arm main body A, the upper half body AU extends a long way further outward than the lower half body AL, and an upwardly facing cylindrical ball joint support part P3 is formed integrally with the extended part AUe by burring so that the extended part is the wheel support part AW, the base end part of the ball joint BJ supporting the wheel support member N being able to be press-fitted into the ball joint support part P3. A pair of reinforcing ribs 10 are formed in a forked shape on the upper wall part 1 of the upper half body AU on opposite sides of the ball joint support part P3, thus reinforcing a section surrounding the ball joint support part P3.

The operation of the above embodiment is now explained. With regard to the arm main body A of the lower arm LA as an L-type suspension arm, the upper half body AU and the lower half body AL thereof are separately formed by press forming a plate material in advance. Furthermore, the front and rear support plates SF and SR, which form the first vehicle body side linking portion AF1, are also separately formed by press forming a plate material in advance, the base parts SFa and SRa of the two support plates SF and SR are welded to each other to thus assemble a support plate assembly, that is, the first vehicle body side linking portion AF1, and this assembly is welded to the outside face of the arm main body A (only the upper half body AU in the illustrated example).

In this way, since the first vehicle body side linking portion AF1 can be formed simply by means of the joined two-piece structure of the front and rear support plates SF and SR while ensuring a sufficient cross-section, even if a large fore-and-aft load from the wheel acts on the first vehicle body side linking portion AF1 when the vehicle is braking, accelerating, turning, etc., this can be sufficiently counteracted. Moreover, since the first vehicle body side linking portion AF1 is formed from only two press formed products, that is, the joined two-piece structure, the management of components can be simplified, and there is a large contribution to weight reduction and cost saving.

Furthermore, since the structure is such that the cylindrical first bush support parts P1 and P1 are formed on the same axis integrally with the extremity parts SFb and SRb of the front and rear support plates SF and SR by burring, the first bush support parts P1 and P1 can be integrated with the front and rear support plates SF and SR without specially welding a collar that would be a first vehicle body side linking portion as in a Conventional Example. As a result, not only is it possible to eliminate the problems of the Conventional Example caused by welding of a collar, but it is also possible to ensure a sufficient support span in the fore-and-aft direction for the first bush B1, which is fitted into and supported by the first bush support parts P1 and P1, thus stabilizing and strengthening the support by means of a simple structure.

As shown in FIG. 14, in a Conventional Example in which a horn-shaped support part for supporting a collar, which is a first vehicle body side linking portion, is simultaneously press formed in a longitudinally intermediate part of an upper half body AU, it is necessary to form a horn-shaped projecting portion X' that protrudes considerably from the main line in a blank material BA' prior to press forming so as to correspond to the horn-shaped support part, and this projecting portion X' is the main cause of degradation in the efficiency with which the blank materials BA' can be arranged in a starting plate material Z (and, consequently, in the material yield) and of an increase in materials cost. In contrast, in this embodiment, since the outline of the blank material BA before press forming of the arm main body A can be formed as smoothly as possible compared with the outline of the blank material BA' of the Conventional Example, it becomes possible to enhance the efficiency with which the blank materials BA' are arranged in the starting plate material Z and improve the material yield, thus further saving cost.

Furthermore, in the illustrated example, the base parts SFa and SRa of the front and rear support plates SF and SR are welded, among the upper and lower half bodies AL of the arm main body A, only to the upper half body AU. Because of this, the face of the arm main body A on which there is a welded joint to the support plates SF and SR is the upper half body AU only, that is, is one large face, and it therefore becomes possible to carry out continuous strong welding, thus stabilizing the weld quality. Moreover, this effect becomes outstanding particularly when as in the illustrated example the downward protrusion of the lower half body AL from the lower end of the side wall part 2 of the upper half body AU is small or zero, that is, when the effective height of the side wall part 2 of the upper half body AU is large.

Furthermore, the joining flange parts 3/1, 3/2, 4/1, and 4/2, which are in surface contact with the outside face and the upper face of the upper half body AU and are welded by the welds w2, w3, w4, and w5, are integrally provided with at least one part of the base ends of the front and rear support plates SF and SR in particular. Because of this, the joining flange parts 3/1, 3/2, 4/1, and 4/2 can stabilize the precision of the gap between the support plates SF and SR and the outer face of the upper half body AU, thereby improving the ease of welding and further stabilizing the weld quality. Moreover, in accordance with the joining flange parts 3/1, 3/2, 4/1, and 4/2 being specially provided, since the front and rear support plates SF and SR can be welded to the outer face of the upper half body AU in a stable attitude, it becomes easy to ensure the weld strength.

Furthermore, in the illustrated example, at least one part of the base parts SFa and SRa of the front and rear support plates SF and SR has a closed cross-sectional structure due to them being joined to each other. Because of this, at least one part of the base parts SFa and SRa of the front and rear support plates SF and SR has a tubular cross-section, and the rigidity and strength of the base parts SFa and SRa of the support plates, which are formed from a plate material, can be enhanced, thus correspondingly increasing the rigidity with which the first bush B1 is supported (rigidity of linking to the vehicle body F).

With regard to the other end part of the arm main body A, that is, the rear end part, the lower half body AL extends a long way further outward than the upper half body AU, and the upwardly facing cylindrical second bush support part P2 is formed integrally with the extended part ALe by burring so that the extended part is the second vehicle body side linking portion AF2, the second bush support part P2 being capable of fitting onto and supporting the outer tubular part of the second bush B2. Because of this, the second vehicle body side linking portion AF2, which bears a relatively small load (that is, mainly bears impact load) compared with the first vehicle body side linking portion AF1, which mainly bears a load in the fore-and-aft direction when the vehicle is traveling, can be obtained by a simple structure in which the extended part of the lower half body AL is merely subjected to burring, thus saving processing cost and improving the work efficiency.

Furthermore, the outer peripheral face, close to the intermediate part of the arm main body A, of the second bush support part P2, which is formed by burring, is butt-welded by the weld w9 to the outer end face of the upper half body AU, which is formed in an arc shape in plan view so as to correspond thereto, the second bush support part P2, which is integral with the lower half body AL, and the upper half body AU are joined and integrated, thus enabling the rigidity with which the second bush B2 is supported by the bush support part P2 (that is, the rigidity of linking to the vehicle body F) to be sufficiently enhanced. In this case, a large reaction force transmitted from the second bush B2 to the second bush support part P2 can be held by the upper half body AU and the lower half body AL in a doubly supported state, thus providing a bush retaining structure having strength and durability.

Moreover, in the illustrated example, the outer peripheral face of the second bush support part P2 projects further upward than the arc-shaped outer end face of the upper half body AU by a predetermined amount, and the outer peripheral face of the projecting part and the upper face of the outer end part of the upper half body AU are welded by the weld w9 via a predetermined area in the peripheral direction of the bush support part P2. Because of this, it becomes possible to ensure sufficient welding allowance between the outer peripheral face of the second bush support part P2 and the upper face of the outer end part of the upper half body AU both in the peripheral direction and the height direction of the bush support part P2, thus enhancing the weld strength.

Figure 15:
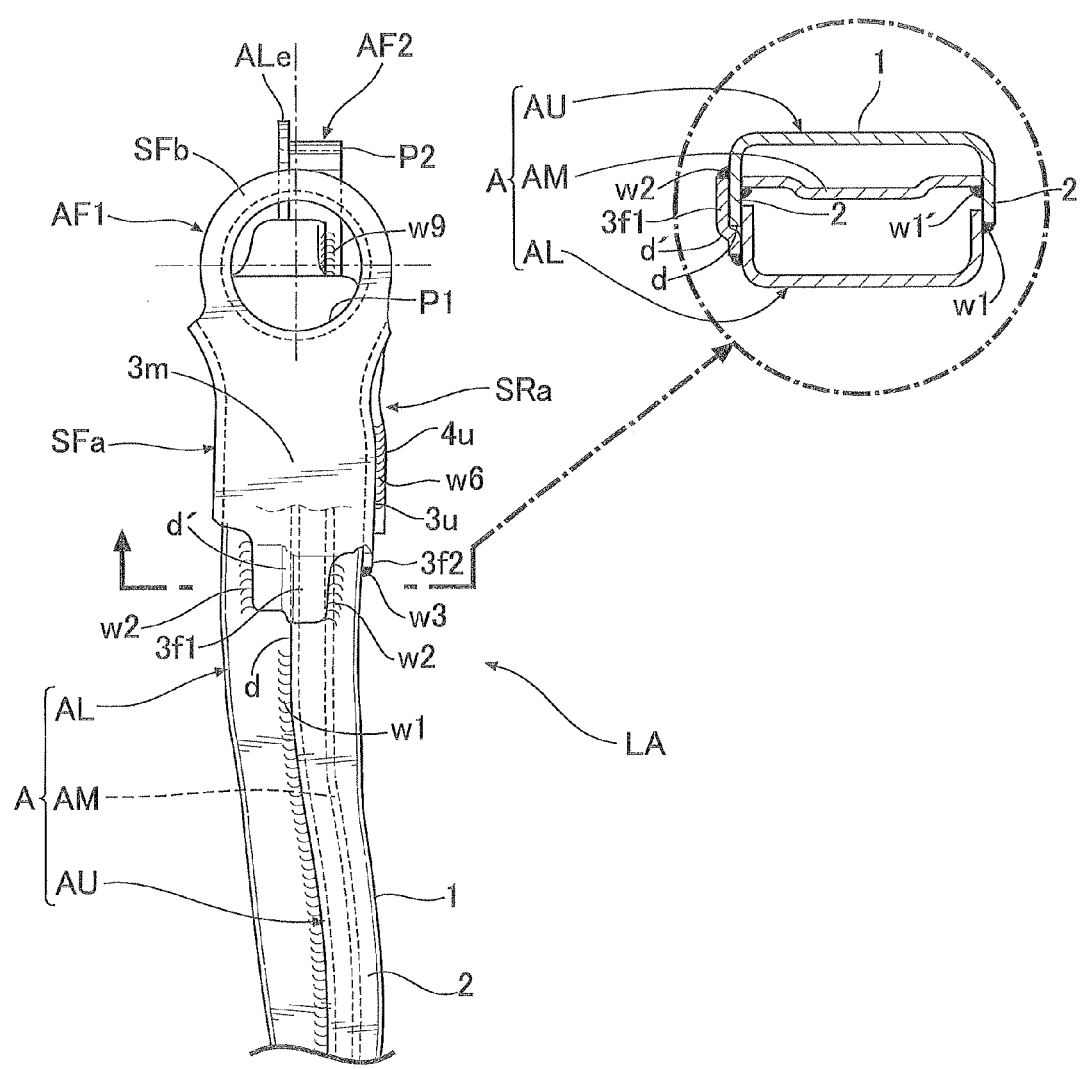
FIG. 15 is a view, corresponding to FIG. 4, showing another embodiment of the present invention and a partial enlarged sectional view.

Furthermore, FIG. 15 shows an essential part of another embodiment of the present invention. In this embodiment, a lower part of a lower half body AL that is press formed so as to have a U-shaped cross-section protrudes a long way further downward than the lower end of a side wall part 2 of an upper half body AU having an inverted U-shaped cross-section, thus forming a step d on an outside face of a part where the upper and lower half bodies AU and AL are joined. A step d' corresponding to the step d of an arm main body A is formed simultaneously on joining flange parts 3/1 and 4/1 of front and rear support plates SF and SR, which become a first vehicle body side linking portion AF1, when press forming the support plates SF and SR. Furthermore, welds w2 and w4 between the joining flange parts 3/1 and 4/1 and the arm main body A (upper and lower half bodies AU and AL) are made at edges, along the longitudinal direction of the arm main body A, of the joining flange part 3/1 and 4/1 as shown in FIG. 15. A weld w1 between the upper and lower half bodies AU and AL can be omitted in order to save cost as in the illustrated example in a predetermined area corresponding to the joining flange parts 3/1 and 4/1, but the weld w1 may also be present in the predetermined area.

In this embodiment, since step processing of the joining flange parts 3/1 and 4/1 can be carried out easily, precisely, and reliably by pressing of the front and rear support plates SF and SR with a direction along the vehicle body fore-and-aft direction as the press direction as described above, it is possible to stably ensure the join quality of the weld between the upper and lower half bodies AU and AL and the joining flanges 3/1 and 4/1.

Embodiments of the present invention are explained above in detail, but the present invention is not limited to the above embodiments and a variety of small design modifications may be carried out.

For example, in this embodiment, the vehicular suspension arm of the present invention may be applied to either a front wheel or a rear wheel.

Furthermore, the above embodiments show an arrangement in which the ball joint support part P3 is formed by burring of the upper half body AU in the wheel support part AW on one end part of the arm main body A, but in the present invention a ball joint support part that is prepared separately from an arm main body A may be subsequently joined to the arm main body.

Moreover, the above embodiments show an arrangement in which the second bush support part P2 is formed by burring of the lower half body AL in the second vehicle body side linking portion A2 on the other end part of the arm main body A, but in the present invention a second bush support part may be formed by burring on both upper and lower half bodies AU and AL or a second bush support part that is prepared separately from an arm main body A may be subsequently joined to the arm main body.

The invention claimed is:

1. A vehicular L-shape suspension arm in which a wheel support part (AW) that is capable of supporting a wheel is provided on one end part of an arm main body (A) that is L-shaped in plan view, a first vehicle body side linking portion (AF1) that is capable of being swingably linked to a vehicle body (F) via a first bush (B1) arranged with an axis thereof lying in a fore-and-aft direction of the vehicle body is provided in an intermediate part of the arm main body (A), and a second vehicle body side linking portion (AF2) that is capable of being swingably linked to the vehicle body (F) via a second bush (B2) arranged with an axis thereof lying in an up-and-down direction is provided on the other end part of the arm main body (A), the first vehicle body side linking portion (AF1) and the second vehicle body side linking portion (AF2) being disposed on the front side and the rear side respectively in the vehicle body fore-and-aft direction, characterized in that the arm main body (A) comprises an upper half body (AU) formed with an inverted U-shaped cross-section by press forming a plate material while having an upper wall part (1) and a pair of side wall parts (2) extending downward from opposite sides of the upper wall part (1), and a lower half body (AL) secured to the upper half body (AU) so as to block a lower open end thereof, the first vehicle body side linking portion (AF1) comprises front and rear support plates (SF, SR) that are each formed by press forming a plate material and are arranged in the vehicle body fore-and-aft direction, the front and rear support plates (SF, SR) have base parts (SFa, SRa) thereof integrally joined to each other, base ends thereof are each welded to an outside part of the arm main body (A), extremity parts (SFb, SRb) of the front and rear support plates (SF, SR) are arranged so as to be spaced from each other in the vehicle body fore-and-aft direction, and the extremity parts (SFb, SRb) each have a cylindrical bush support part (P1) formed integrally therewith on the same axis by burring, the bush support part (P1) being capable of fitting onto and supporting an outer tubular part of the first bush (B1).

2. The vehicular L-shape suspension arm according to claim 1, wherein with regard to the base parts (SFa, SRa) of the front and rear support plates (SF, SR) at least one portion thereof has a closed cross-sectional structure due to the base parts being joined to each other.

3. The vehicular L-shape suspension arm according to claim 1 or 2, wherein the front and rear support plates (SF, SR) are each press-formed with a direction in which the support plates (SF, SR) move closer to each other along the vehicle body fore-and-aft direction as the press direction, a linking arm part (3u, 3l; 4u) is press-formed integrally with an edge part on at least one side of the base part (SFa, SRa) of at least one support plate (SF, SR), the linking arm part (3u, 3l; 4u) extending toward the other support plate (SR, SF), and the front and rear support plates (SF, SR) are welded between the linking arms (3u, 4u) or between the linking arm part (3l) and the other support plate (SR).

4. The vehicular L-shape suspension arm according to claim 1, wherein each of the base parts (SFa, SRa) of the front and rear support plates (SF, SR) is welded, among the upper and lower half bodies (AL) of the arm main body (A), to the upper half body (AU).

5. The vehicular L-shape suspension arm according to claim 1, wherein at least one part of the base end of each of the front and rear support plates (SF, SR) is integrally provided with a joining flange part (3/1, 3/2, 4/1, 4/2) that is in surface contact with and welded to an outer face of the arm main body (A).

* * * * *